United States Patent

Im

(10) Patent No.: US 9,900,111 B2
(45) Date of Patent: Feb. 20, 2018

(54) USER EQUIPMENT IN MOBILE COMMUNICATION SYSTEM AND CONTROL METHOD THEREOF

(71) Applicant: Samsung Electronics Co., Ltd., Gyeonggi-do (KR)

(72) Inventor: Se-Bin Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/225,034

(22) Filed: Aug. 1, 2016

(65) Prior Publication Data

US 2017/0064615 A1 Mar. 2, 2017

(30) Foreign Application Priority Data

Aug. 31, 2015 (KR) ........................ 10-2015-0122678

(51) Int. Cl.
| | |
|---|---|
| *H04M 1/66* | (2006.01) |
| *H04M 3/16* | (2006.01) |
| *H04B 15/00* | (2006.01) |
| *H04W 4/08* | (2009.01) |
| *H04W 4/02* | (2018.01) |
| *H04W 48/10* | (2009.01) |
| *H04W 84/04* | (2009.01) |
| *H04W 48/02* | (2009.01) |
| *H04W 48/16* | (2009.01) |

(52) U.S. Cl.
CPC .............. *H04B 15/00* (2013.01); *H04W 4/02* (2013.01); *H04W 4/08* (2013.01); *H04W 48/10* (2013.01); *H04W 48/02* (2013.01); *H04W 48/16* (2013.01); *H04W 84/045* (2013.01)

(58) Field of Classification Search
CPC ......... H04W 48/14; H04W 4/08; H04W 4/02; H04W 84/045; H04W 48/10; H04W 48/16; H04W 48/02; H04B 15/00
See application file for complete search history.

(56) References Cited

U.S. PATENT DOCUMENTS

| | | | |
|---|---|---|---|
| 2009/0040972 A1* | 2/2009 | Robson | H04W 16/14 370/329 |
| 2010/0298005 A1* | 11/2010 | Yavuz | H04W 52/244 455/452.2 |
| 2012/0115498 A1* | 5/2012 | Kim | H04W 52/244 455/452.2 |
| 2012/0129522 A1* | 5/2012 | Kim | H04W 72/0426 455/434 |
| 2012/0281573 A1* | 11/2012 | Kazmi | H04W 8/26 370/252 |
| 2013/0033998 A1* | 2/2013 | Seo | H04W 24/00 370/252 |
| 2013/0157680 A1* | 6/2013 | Morita | H04W 52/244 455/452.2 |

(Continued)

*Primary Examiner* — Ajit Patel
(74) *Attorney, Agent, or Firm* — The Farrell Law Firm, P.C.

(57) ABSTRACT

Disclosed are a user equipment and a control method thereof. The user equipment includes a transceiver, a memory, and a processor that is electrically connected with the transceiver and the memory, wherein the processor, if the user equipment is located in a predetermined interference region, determines whether or not there is an interference cell in the interference region, and if there is an interference cell, controls to block an attempt to access the interference cell by the user equipment.

18 Claims, 12 Drawing Sheets

(56) References Cited

U.S. PATENT DOCUMENTS

| | | | |
|---|---|---|---|
| 2013/0223400 A1* | 8/2013 | Seo | H04J 11/005 |
| | | | 370/329 |
| 2014/0031050 A1* | 1/2014 | Boudreau | H04W 72/1231 |
| | | | 455/452.1 |
| 2014/0098773 A1 | 4/2014 | Yoo et al. | |
| 2014/0140295 A1* | 5/2014 | Manssour | H04L 5/0032 |
| | | | 370/329 |
| 2014/0200021 A1* | 7/2014 | Jiao | H04W 72/1226 |
| | | | 455/452.2 |
| 2014/0269246 A1 | 9/2014 | Yoo et al. | |
| 2014/0295832 A1* | 10/2014 | Ryu | H04W 48/16 |
| | | | 455/434 |
| 2014/0328309 A1* | 11/2014 | Comstock | H04W 72/082 |
| | | | 370/329 |
| 2014/0335862 A1 | 11/2014 | Wang et al. | |
| 2015/0181558 A1* | 6/2015 | Yang | H04L 5/005 |
| | | | 370/312 |
| 2016/0295521 A1* | 10/2016 | Grayson | H04W 4/02 |

\* cited by examiner

USER EQUIPMENT IN MOBILE COMMUNICATION SYSTEM AND CONTROL METHOD THEREOF

PRIORITY

This application claims priority under 35 U.S.C. §119(a) to Korean Patent Application Serial No. 10-2015-0122678, which was filed in the Korean Intellectual Property Office on Aug. 31, 2015, the entire content of which is incorporated herein by reference.

BACKGROUND

1. Field of the Disclosure

The present disclosure generally relates to a user equipment and a network in a mobile communication system and a control method thereof, and more particularly, to a user equipment to prevent or cancel interference that occurs between cells, and a control method thereof.

2. Description of the Related Art

Recently, studies on femto-cell (including femto-base stations) technology have been widely conducted. The femto-cell refers to a mobile communication base station that is used indoors, such as in homes or offices. The femto-cell may be connected to an IP network that is provided in the home or office, and may be connected to a core network of the mobile communication system through the IP network in order to provide mobile communication services to the user. The user may be provided with outdoor services through the existing macro-cell, and may be provided with indoor services through the femto-cell. The femto-cell may be connected to the core network of the mobile communication system through a digital subscriber line (DSL).

SUMMARY

According to the femto-cell described above, when the user equipment enters the coverage area of the femto-cell that is provided to the user through a CSG (Closed Subscriber Group), the user equipment may receive the femto-cell signal more strongly than the signal of the macro-cell. Accordingly, the user equipment may attempt to connect to the femto-cell. However, if the user equipment is an unlicensed user with respect to the femto-cell, the user equipment cannot connect to the femto-cell, and the signal of the femto-cell may be detected as an interference signal.

Accordingly, an aspect of the present disclosure provides a user equipment that, when the femto-cell is determined to be the interference cell, blocks an attempt to connect to the base station that supports the interference cell, and cancels signals that are received from the base station that supports the interference cell.

Another aspect of the present disclosure provides a control method of the user equipment, which, when the femto-cell is determined to be the interference cell, blocks an attempt to connect to the base station that supports the interference cell, and cancels signals that are received from the base station that supports the interference cell.

In another aspect of the present disclosure, when the femto-cell is determined to be the interference cell, an attempt to connect to the base station that supports the interference cell may be blocked, and the interference signal received from the base station that supports the interference cell may be cancelled so that the quality of the received signal can be improved.

According to an aspect of the present disclosure, a user equipment includes a transceiver, a memory, and a processor that is electrically connected with the transceiver and the memory, wherein the processor, if the user equipment is located in a predetermined interference region, determines whether there is an interference cell in the predetermined interference region, and if there is an interference cell, controls to block an attempt to access the interference cell by the user equipment.

According to another aspect of the present disclosure, a control method of a user equipment includes determining whether the user equipment is located in a predetermined interference region, if the user equipment is located in the predetermined interference region, determining whether there is an interference cell in the predetermined interference region and if there is an interference cell, blocking an attempt to access the interference cell by the user equipment.

According to various embodiments of the present disclosure, a server in a mobile communication system includes a shared database and an information processor, wherein the shared database stores predetermined interference region location information and interference cell identification information and wherein the information processor is configured to send to and receive from a user equipment, predetermined interference region location information and interference cell identification information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
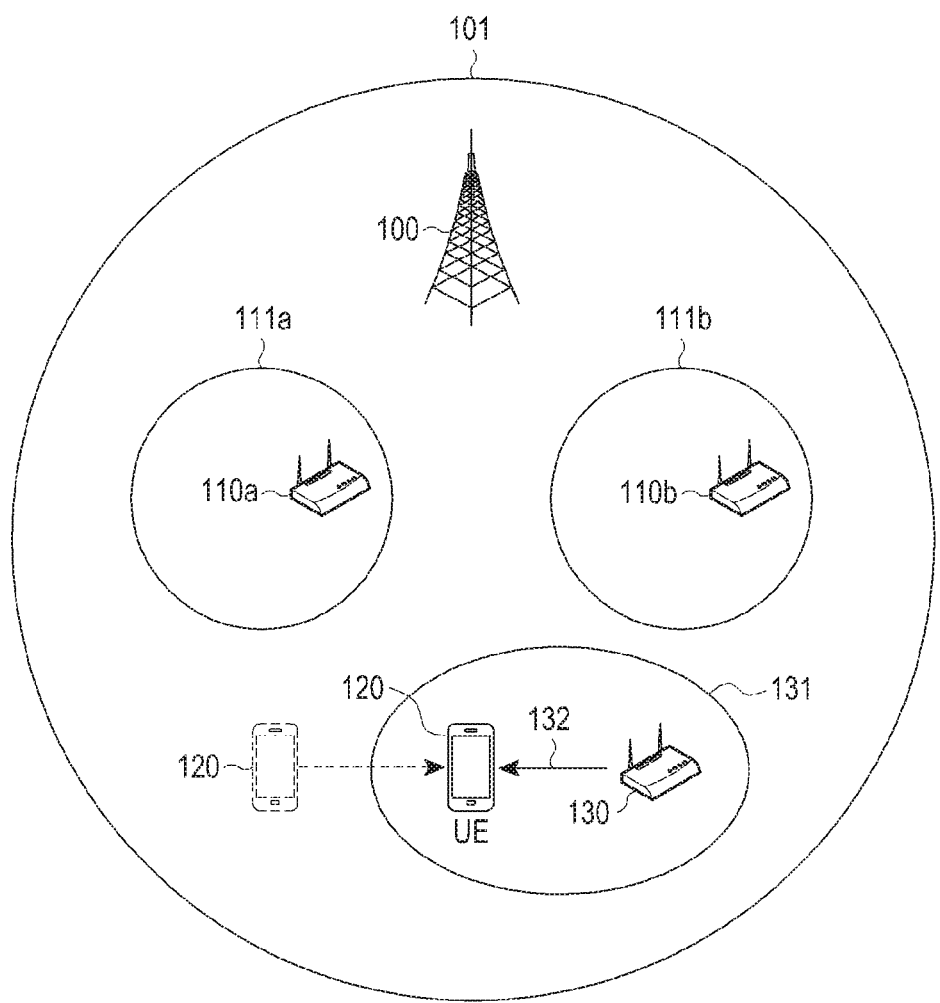
FIG. 1 illustrates a network environment when the user equipment is located in the interference cell, according to various embodiments of the present disclosure.

It will be apparent to those skilled in the art that the advantages of the present disclosure are not limited to those mentioned above, and the present disclosure includes various implicit advantages.

Hereinafter, various embodiments of the present disclosure will be described with reference to the accompanying drawings. However, it should be understood that the present disclosure is not limited to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it should be understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "control module adapted (or configured) to perform A, B, and C" may refer to a dedicated control module (e.g. embedded control module) only for performing the corresponding operations or a general-purpose control module (e.g., central processing unit (CPU) or application processor (AP)) that can perform the corresponding operations by executing one or more software programs stored in a storage module device.

The terms used herein are merely for the purpose of describing particular embodiments and do not limit the scope of other embodiments. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

Hereinafter, a communication device and a user equipment, according to various embodiments, will be described with reference to the accompanying drawings. In the present disclosure, the user may refer to a person who uses the communication device, an apparatus that uses the communication device (for example, artificial intelligence devices), a person who uses the user equipment, or an apparatus that uses the user equipment.

Referring to FIG. 1, the macro-cell 101, which is supported by the macro base station 100, includes one or more femto-base stations 110a, 110b, and 130 and one or more femto-cells 111a, 111b, and 131. The femto-cells 111a, 111b, and 131 may operate as serving cells (for example, the femto-cells 111a and 111b) or as interference cells (for example, the femto-cell 131) with respect to the user equipment 120. Since the user equipment 120 is an unlicensed user with respect to the femto-base station 130, when the user equipment 120 is located in the femto-cell 131 or is located near the femto-cell 131, the user equipment 120 may receive a signal from the femto-base station 130, and may perform a function/functions or an operation/operations to be connected to the femto-base station 130. However, since the user equipment 120 is an unlicensed user with respect to the femto-base station 130, the function/functions or the operation/operations to be connected to the femto-base station 130 may not be necessary, and the signal 132 transmitted from the femto-base station 130 may act as an interference signal to the user equipment 120 so that the quality of the signal received in the user equipment 120 may be deteriorated.

Figure 2A:
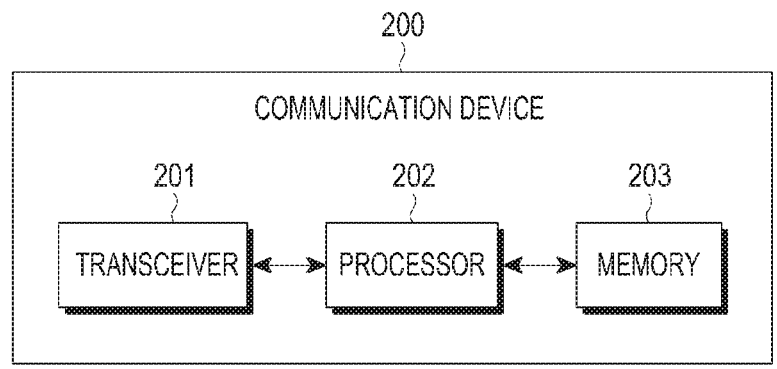
FIG. 2A is a block diagram of a communication device, according to various embodiments of the present disclosure.

FIG. 2A is a block diagram of a communication device, according to various embodiments of the present disclosure.

Referring to FIG. 2A, the communication device 200, according to various embodiments of the present disclosure, includes at least one of a transceiver 201, a processor 202, or a memory 203.

The transceiver 201, for example, may configure the communication between the communication device 200 and the external devices (for example, the first external electronic device 230, the second external electronic device 240, or a server 250). For example, the transceiver 270 may be connected to a network 220 through wireless communication or wired communication in order to communicate with the external devices. The "transceiver 201" may be replaced by a variety of terms, such as "communication module" or "communication interface."

The wireless communication, may use as a cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), or GSM (Global System for Mobile Communications). In addition, the wireless communication may include short range communication. The short range communication may include at least one of WiFi (Wireless Fidelity), Bluetooth (Bluetooth), NFC (near field communication), or a GNSS (global navigation satellite system). The GNSS may include at least one of a GPS (Global Positioning System), a Glonass (Global Navigation Satellite System), a Beidou Navigation Satellite System (Beidou), the Galileo, or the European global satellite-based navigation system, according to the usage area. Hereinafter, in the present disclosure, "GPS" may be interchangeably used with the "GNSS." The wired communication, for example, may include at least one of a USB (universal serial bus), an HDMI (high definition multimedia interface), RS-232 (recommended standard 232), or a POTS (plain old telephone service). The network 220 may include at least one of telecommunication networks, such as computer networks (e.g., LAN or WAN), the Internet, or a telephone network.

The processor 202 may include a communication processor (CP). According to various embodiments of the present disclosure, the processor 202 may include at least one of a CPU (central processing unit) or an application processor (AP). The processor 202, for example, may perform a calculation or data-processing for the control and/or communication of one or more other elements of the communication device 200. The term "processor" may be replaced by a variety of terms, such as "control module," "control unit," or "controller" in some embodiments.

The memory 203 may include a volatile and/or non-volatile memory. The memory 203, for example, may store instructions or data related to one or more other elements of the communication device 200. According to an embodiment of the present disclosure, the memory 203 may store software and/or programs. The programs, for example, may include a kernel, middleware, an application programming interface (API), and/or application programs (or "applications"). Although the memory 203 is illustrated to be included in the communication device 200 in FIG. 2A, this is only an example to describe the present disclosure. The memory 203 may be omitted in the manufacturing process of the communication device 200.

Figure 2B:
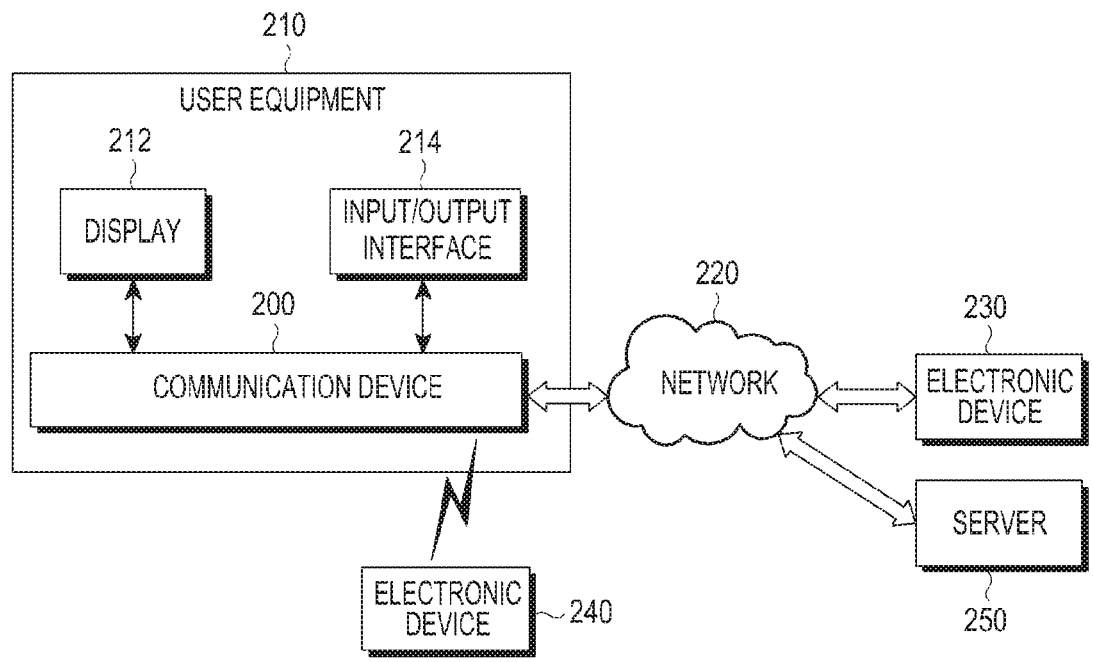
FIG. 2B is a block diagram of a user equipment in a network environment, according to various embodiments of the present disclosure.

FIG. 2B is a block diagram of a user equipment in a network environment, according to various embodiments of the present disclosure.

Referring to FIG. 2B, the user equipment 210, according to various embodiments of the present disclosure, include the communication device 200, a display 212, and an input/output interface 214.

The display 212, for example, may include a liquid crystal display (LCD), an LED (light-emitting diode) display, an organic light-emitting diode (OLED) display, a micro-electro-mechanical system (MEMS) display, or an electronic paper display. The display 212, for example, may display various types of content (e.g., text, images, videos, icons, or symbols) to the user. The display 212 may include a touch screen, and for example, may receive a touch input, a gesture input, a proximity input, or a hovering input by using an electronic pen or user's body parts.

The input/output interface 214, for example, may serve as an interface that transfers instructions or data received from the user or other external devices to other elements of the user equipment 210. In addition, the input/output interface 214 may output instructions or data received from other elements of the user equipment 210 to the user or other external devices.

The server 250, for example, may include a central management server (CMS). The central management server may include a server that is managed by a service provider. The central management server, for example, may include a server that is managed by the manufacturer of the user equipment 210 or the manufacturer of a modem that is provided in the user equipment 210. The server 250 may include an information processor (e.g., an information processor 711) and a shared database (SBD) 712. The server 250 may be connected with the macro base station (e.g., a macro base station 400). The shared database, for example, may store coordinate information that indicates the location of the user equipment 210, cell identification information (the cell ID), synchronization information, such as a time offset or a frequency offset, a database of licensed femto-cell users or information related to the intensity of the signal transmitted by one or more base stations.

According to various embodiments of the present disclosure, the user equipment 210 may include a storage module (e.g., the memory) or a processor (e.g., the application processor).

Figure 3:
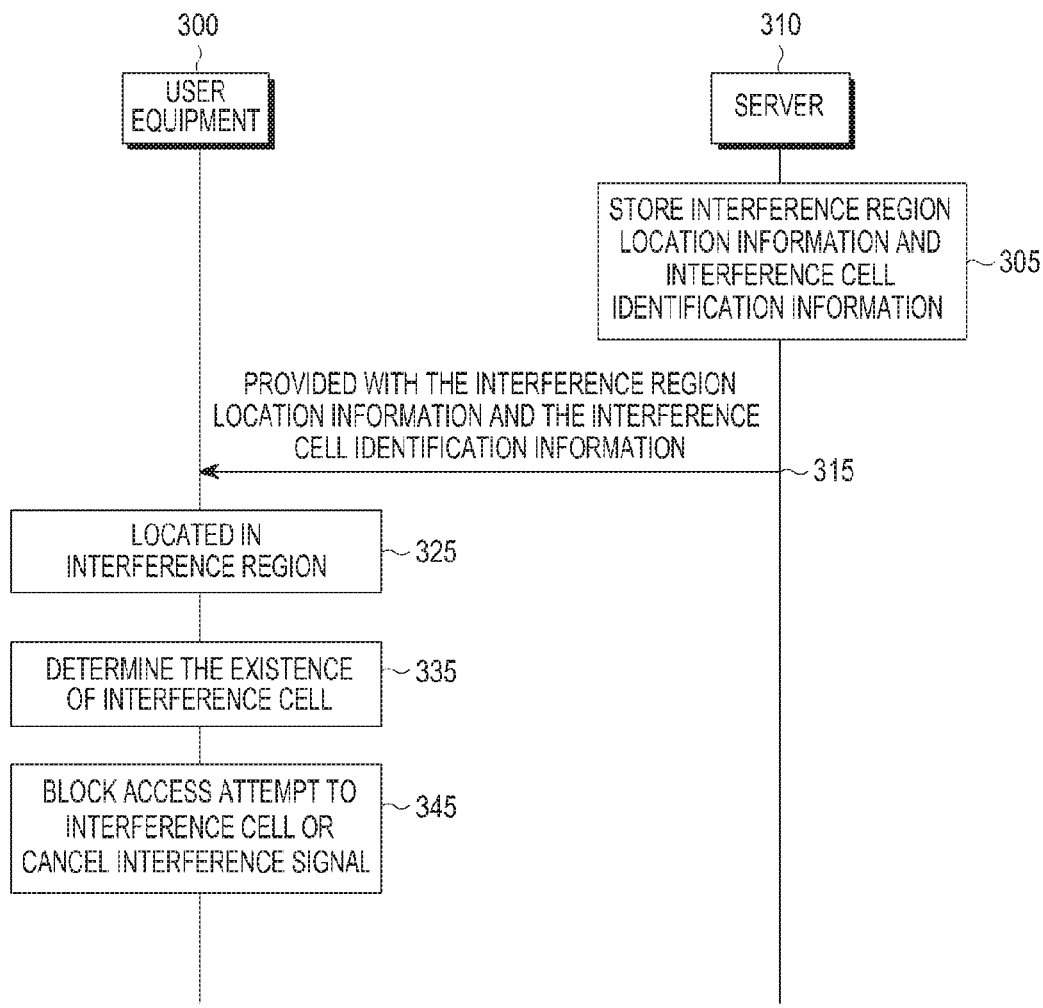
FIG. 3 is a flow diagram of operations which are executed between the user equipment and a server, when the interference cell exists in an interference region to which the user equipment belongs, according to various embodiments of the present disclosure.

FIG. 3 is a flow diagram of operations which are executed between the user equipment and a server, when the interference cell exists in an interference region to which the user equipment belongs, according to various embodiments of the present disclosure.

A server 310, according to various embodiments of the present disclosure, is configured to store location information on the interference region (e.g., the interference region 420a of FIG. 4A), which is determined according to the existence of the interference cell (e.g., the femto-cell 431 of FIG. 4A), and cell identification information of the interference cell contained in the interference region in step 305. The location information of the interference region and the cell identification information of the interference cell may be received from the user equipment 300 to be stored in the server 310. Alternatively, the location information of the interference region and the cell identification information of the interference cell may be pre-stored in the server 310. Alternatively, the location information of the interference region and the cell identification information of the interference cell may be provided from another user equipment, which is connected with the server 310, to be stored in the server 310, and the user equipment 300 may share the location information of the interference region and the cell identification information of the interference cell with another user equipment through the server 310. The server 310, for example, may include a central management server (CMS). The server 310 may store a variety of information, such as a transmission pattern in the time-domain of the interference cell, the position of a subframe in which the interference signal is not transmitted, or the position of a subframe in which only the Common Reference Signal (CRS) is transmitted, and/or a transmission pattern in the frequency-domain of the interference cell, such as the position of the RB (Resource Block) in which the interference signal is not transmitted.

The user equipment 300 may be located in the interference region in step 325, as in the case where the user equipment 300 moves into the interference region from the outside. In relation to the interference region, FIG. 4A and FIG. 4B illustrate the interference region, according to various embodiments of the present disclosure.

Figure 4A:
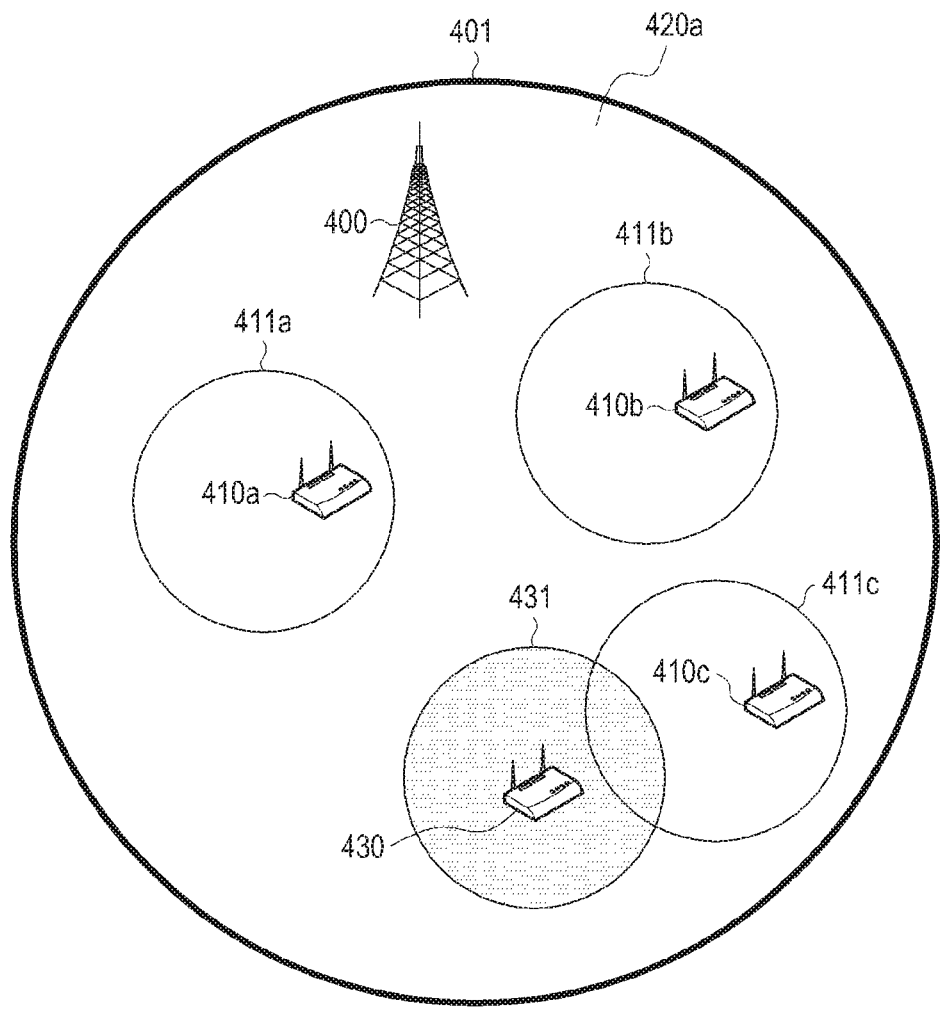
FIG. 4A and FIG. 4B illustrate the interference region, according to various embodiments of the present disclosure.
Figure 4B:
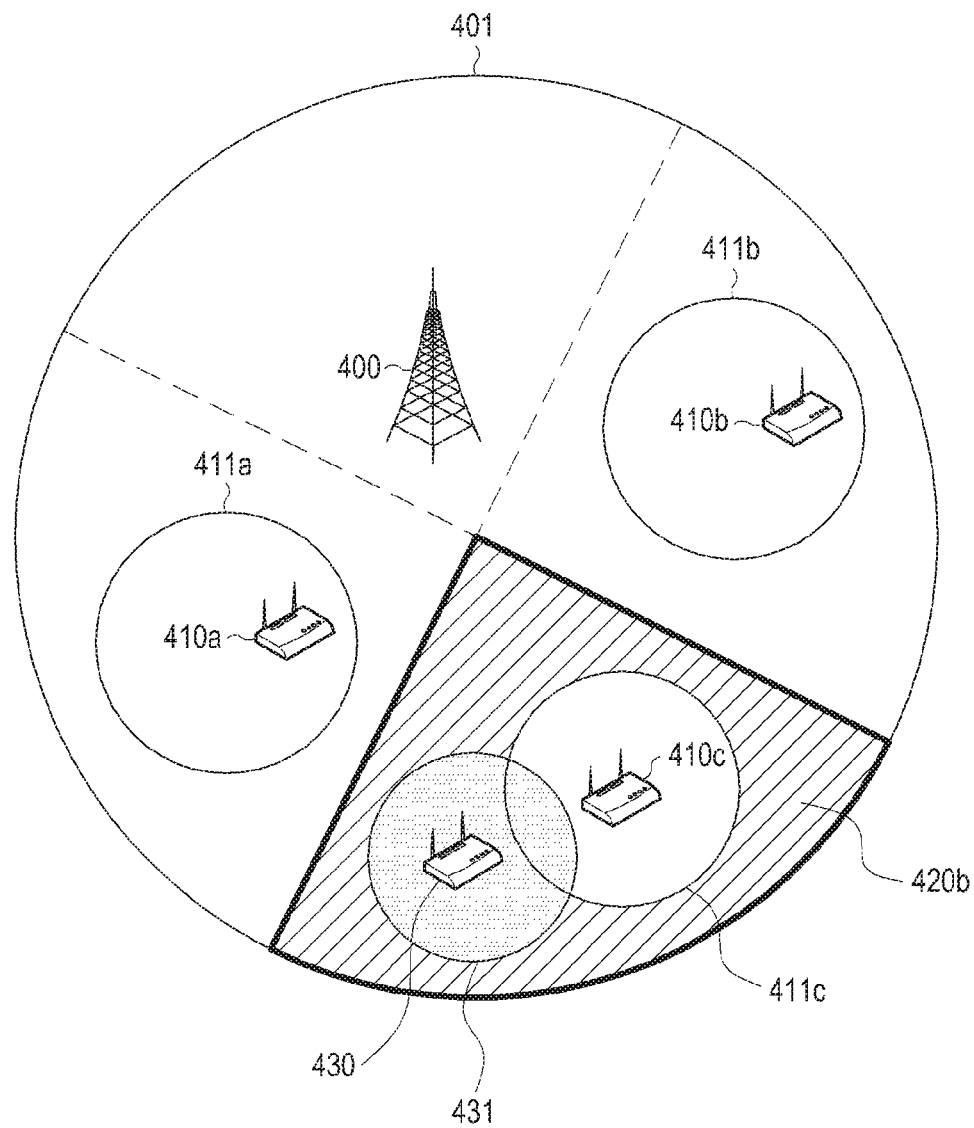

Referring to FIG. 4A, the interference region, according to various embodiments of the present disclosure, include a macro-cell 401 region (in other words, the coverage area of a macro base station 400) that includes the interference cell (e.g., the femto-cell 431) and the femto-base station 430 supporting the interference cell. The macro-cell 401, as the interference region, may include a macro base station 400, femto-base stations 410a, 410b, 410c, and 430, and femto-cells 411a, 411b, 411c, and 431 supported by the femto-base stations 410a, 410b, 410c, and 430, respectively. The user equipment 300 may be connected to the femto-cells 411a, 411b, and 411c. That is, the user equipment 300 may be a licensed user with respect to the femto-base stations 410a, 410b, and 410c. The server 310 may store location information on the interference region 420a (e.g., the macro-cell 401 region). The location information, for example, may include coordinate information that indicates the location of the interference region 420a.

The interference region, according to various embodiments of the present disclosure, may include one or more regions (e.g., the interference region 420b) among the regions that are separated according to the intensity of interference signal. That is, as shown in FIG. 4B, the region in which the interference cell (e.g., the femto-cell 431) is located may be determined to be the interference region 420b from among the regions that are determined based on the signal intensity of the interference cell (e.g., the femto-cell 431) and the non-interference cells (e.g., the femto-cells 411a 411b, and 411c). The femto-base stations 410a, 410b, 410c, and 430, which support the femto-cells 411a, 411b, 411c, and 430 respectively, may be located in the macro-cell 401 that is supported by the macro base station 400. The server 310 may store location information on the interference region 420b. The location information, for example, may include coordinates that indicate the interference region 420b.

Figure 5A:
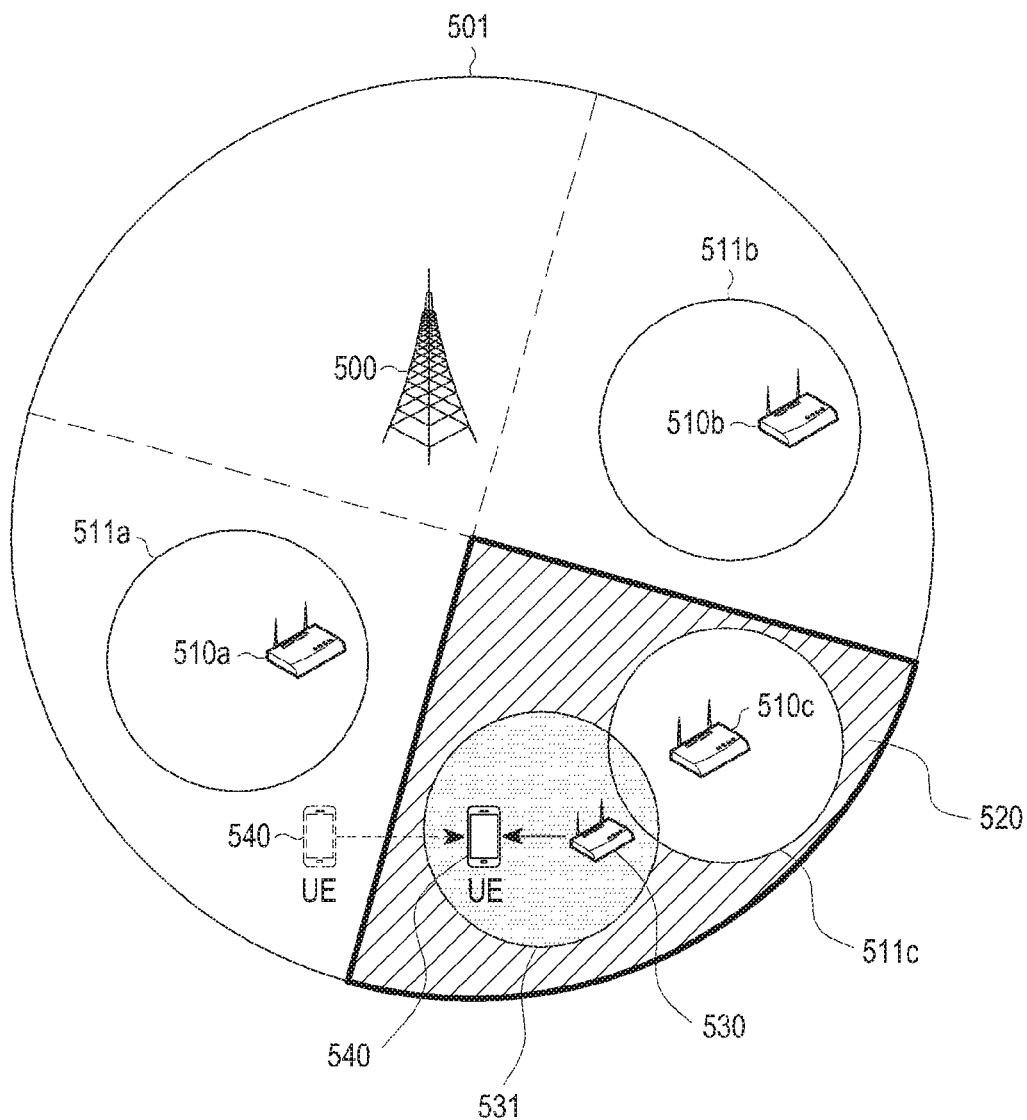
FIG. 5A and FIG. 5B illustrate a network environment in which the user equipment is located in the interference cell, according to various embodiments of the present disclosure.
Figure 5B:
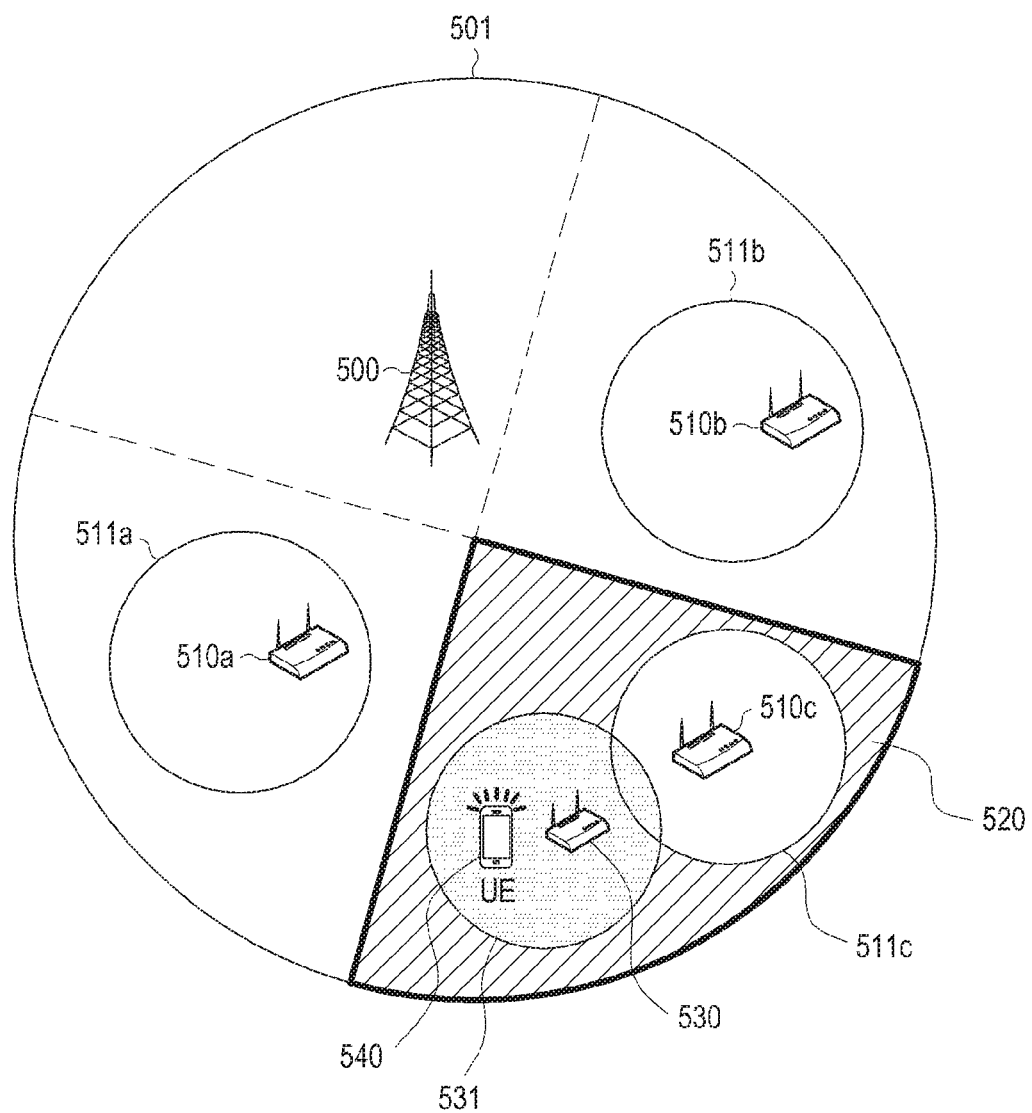

FIG. 5A and FIG. 5B illustrate a network environment in which the user equipment 300 is located within the interference cell, according to various embodiments of the present disclosure.

Referring to FIG. 5A, when the interference region 520 is configured as shown in FIG. 4B, the user equipment 540 may move from the non-interference region (i.e., the region other than the interference region 520) to the interference region 520 to then be located in the interference region 520 as shown in FIG. 5A. FIG. 5A shows the example of a macro-cell 501 that is supported by the macro base station 500, an interference cell (e.g., a femto-cell 531), a femto-base station 530 that supports the interference cell, non-interference cells (e.g., femto-cells 511a, 511b, and 511c), and femto-base stations 510a, 510b, and 510c that support the non-interference cell.

FIG. 5B shows an example in which the user equipment 540 is operating in the interference region 520 or in the femto-cell 531 as the interference cell. When the user equipment 540 is operating in the interference region 520 or in the femto-cell 531, the user equipment 540 may be provided with the location information on the interference region 520 and the cell identification information of the interference cell from the server 310.

The location information and the cell identification information provided from the server 310 may be the information that has been provided to the server 310 by the user equipment 540 or has been pre-stored in the server 310. Alternatively, according to various embodiments of the present disclosure, the location information on the interference region and the cell identification information on the interference cell may be provided from another electronic device (for example, another user equipment), which is connected with the server 310, to be stored in the server 310.

The communication device 200 of the user equipment 300 may control the user equipment 300 to be provided with the location information on the interference region (e.g., coordinates indicating the interference region) from the server 310 in step 315 of FIG. 3, in order to determine whether or not the user equipment 300 has entered (is located in) the interference region of the user equipment 300. The user equipment 300, for example, may request to be provided from the server 310, the location information on the interference region that is contained in a predetermined range based on the current location of the user equipment 300. Alternatively, the user equipment 300 may be provided, from the server 310, with the location information on the interference region based on movement history information for a specific period of time (e.g., one week previously) according to the movement pattern history of the user equipment 300. For example, the user equipment 300 may be provided, from the server 310, with coordinates for the location where the user equipment 300 is interfered with for a specific period of time. The coordinates for the location where the user equipment 300 is interfered with, may be provided to the server 310 by the user equipment 300 or another electronic device to be stored in a common database of the server 310 at the time when the interference occurs.

The communication device 200 of the user equipment 300 may determine whether or not the interference cell exists in the interference region based on the location information provided from the server 310 and the cell identification information of the interference cell in step 335. Step 335 may be conducted through the cell search for one or more cells that are located near the user equipment 300. The cell search may be continuously performed by the user equipment 300 before the user equipment 300 is located in the interference region. However, according to some embodiments, the cell search may be performed when the user equipment 300 is located in the interference region. The user equipment 300 may compare the cell identification information of at least one nearby cell that is obtained as a result of the cell search with the cell identification information of the interference cell, which is provided from the server 320, in order to thereby determine the existence of the interference cell in step 335.

When the user equipment 300 enters or approaches the interference cell, the communication device 200 of the user equipment 300 may control the user equipment 300 to block an attempt to access the interference cell (that is, block an attempt to access the femto-base station that supports the interference cell) and/or to cancel a signal that is output and received from the interference cell (that is, it may be referred to as an "interference signal") in step 345. The function or operation for blocking the connection attempt with the interference cell, for example, may include a function or operation of blocking the transmission of a measurement report message to the femto-base station that supports the interference cell. The interference signal, for example, may include a variety of signals received from the femto-base station 530 to the user equipment 300, such as a pilot signal (such as a CRS (common reference signal)), synchronization signals, such as the primary synchronization signal (PSS) or the secondary synchronization signal (SSS), or a PHICH (physical hybrid ARQ channel) signal. According to various embodiments of the present disclosure, the server 310 may include at least one of various pieces of information for cancelling the interference signal, such as, the CRS signal, the cell identification information for extracting or cancelling the synchronous signals, the duplex mode, the CP (cyclic prefix) type, the number of ports, uplink/downlink (UL/DL) configuration, UE radio network temporary identifier (RNTI) for extracting or cancelling physical downlink control channel (PDCCH) or dedicated reference signal (DRS) signals, the number of PHICH groups for extracting and cancelling a PHICH signal, a lowest radio bearer (RB) number, a demodulation reference signal (DMRS) value, multimedia broadcast multicast service single frequency network MBSFN identification information for extracting or cancelling an modulation reference signal (MRS) signal, a period of MBSFN, MBSFN offset information, timing offset information on the interference signal, or frequency offset information. The interference signal and a variety of information stored in the server 310 described above is only an example for the description of the present disclosure, and it is obvious to those skilled in the art that the present disclosure is not limited thereto.

According to various embodiments of the present disclosure, the communication device 200 of the user equipment 300 may control the user equipment 300 to be connected to the macro base station (for example, the macro base station 500) or femto-cells (for example, the femto-cells 510a, 510b, and 510c) without making a request for the connection with the femto-cell 530 that supports the interference cell even when the user equipment 300 has entered the interference cell (e.g., the femto-cell 531). That is, the handover from the non-interference cell to the interference cell may not be performed.

As described above, although the location information on the interference region (e.g., the interference region 420) and the cell identification information are described to be stored in the server 310 (e.g., the CMS), according to various embodiments of the present disclosure, the location information on the interference region 420 and the cell identification information may be stored in an individual database (IDB), such as the memory 203 of the user equipment 300.

The communication device 200 of the user equipment 300 may control to perform the cell search again after the interference cell signal has been cancelled.

The communication device 200 of the user equipment 300 may be configured to perform channel estimation after the interference cell signal has been cancelled.

The communication device 200 of the user equipment 300 may perform demodulation on the signal received by the user equipment 300 after the interference cell signal has been cancelled.

The communication device 200 of the user equipment 300 may be configured to perform estimation of the channel status and signal quality after the interference cell signal has been cancelled.

Figure 6:
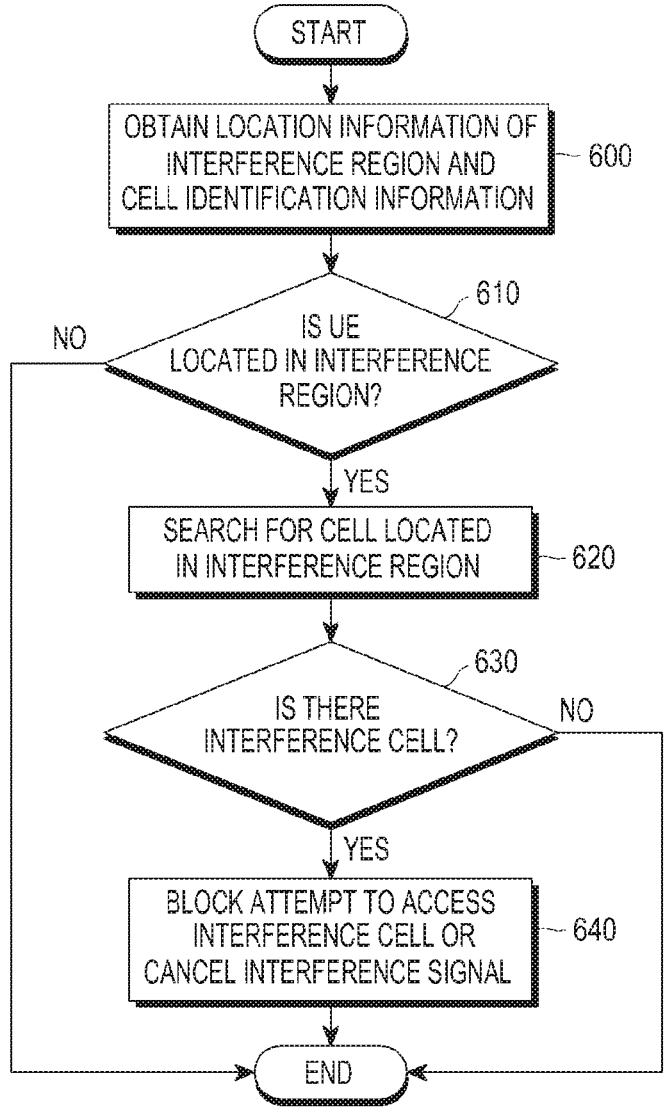
FIG. 6 is a flow chart of a control method of the user equipment, according to various embodiments of the present disclosure.

FIG. 6 is a flowchart of a control method of the user equipment, according to various embodiments of the present disclosure.

Referring to FIG. 6, a control method of the user equipment (e.g., the user equipment 210 or 300) includes an operation of obtaining the location information on the interference region (e.g., the interference regions 420a, 420b, and 520) and the cell identification information on the interference cell in step 600. The obtaining of the location information on the interference region and the cell identification information, may be provided from the server (e.g., the server 310) or by reading the information stored in the memory 303 of the user equipment. Alternatively, obtaining the location information on the interference region and the cell identification information, may be provided by another user equipment that is directly or indirectly connected with the user equipment. According to this configuration, the user equipment shares the location information on the interference region and the cell identification information on the interference cell with another user equipment.

The control method of the user equipment, according to various embodiments of the present disclosure, include an operation of determining whether or not the user equipment has entered (is located in) the interference region based on the obtained location information on the interference region in step 610). The control method of the user equipment, according to various embodiments of the present disclosure, include an operation of searching for one or more cells that are located (contained) in the interference region when the user equipment has entered the interference region in step 620. The cell search may be continuously performed before the user equipment 300 enters the interference region, and it is obvious to those skilled in the art that the cell search is not limited to the operation in which the cell search starts only after the user equipment has entered the interference region according to step 620. However, in some embodiments, the cell search may be performed when the user equipment enters the interference region.

The control method of the user equipment, according to various embodiments of the present disclosure, may include an operation of determining whether or not the interference cell (e.g., the femto-cell 431 or 531) exists in the interference region based on the obtained cell identification information on the interference cell in step 630.

The control method of the user equipment, according to various embodiments of the present disclosure, includes, if the interference cell exists in the interference region (yes in step 630), an operation of blocking an attempt to access the interference cell and cancelling the interference signal received by the user equipment in step 640. Furthermore, the description of the user equipment, as described above, may be applied to the control method of the user equipment, according to various embodiments of the present disclosure as well.

Hereinafter, the operation of receiving the identification information of the interference cell near the user equipment 300 based on the current location of the user equipment 300 without receiving the location information of the interference region from the server 310 or the IDB in advance will be described.

Figure 7:
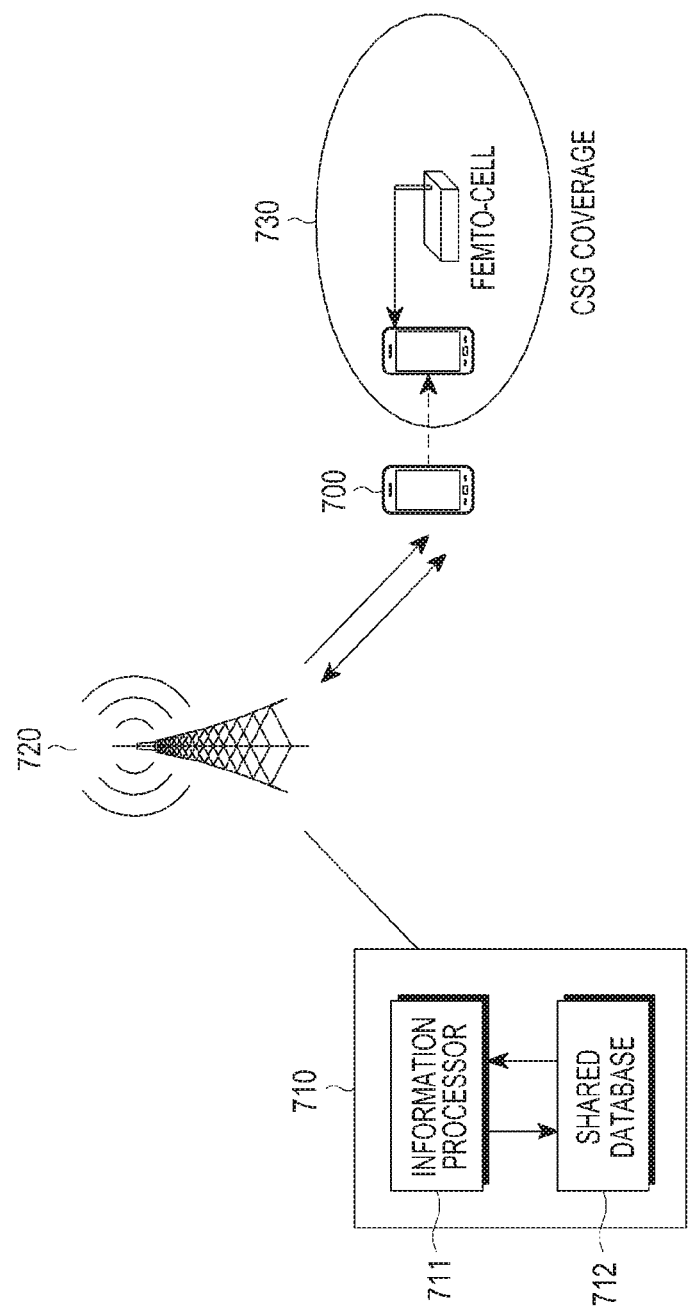
FIG. 7 illustrates an operation in which the user equipment obtains interference cell identification information from the server, according to various embodiments of the present disclosure.

FIG. 7 illustrates an operation in which the user equipment obtains the interference cell identification information from the server, according to various embodiments of the present disclosure.

In FIG. 7, the server 710, receives from the user equipment 700, the information on the current location of the user equipment 700 through the macro-cell 720. If the current location of the user equipment 700 is provided, the information processor 711 of the server 710 may determine whether or not the interference cell 730 is located near the current location of the user equipment 700 (for example, the macro-cell to which the user equipment 700 belongs). The information on the interference cell according to the current location of the user equipment 700, for example, may be stored in the shared database 712. If the interference cell 730 is located near the user equipment 700, the information processor 711 may provide the information on the interference cell 730, which is stored in the server 710, to the user equipment 700. According to the operation above, the user equipment 700 may obtain the information on the interference cell 730 prior to entering the interference cell 730 to quickly perform the avoidance of interference and/or attenuation operation of the interference cell 730. Various methods of attenuating the interference, such as a method of lowering the CINR (Carrier to Interference Ratio) value for the region of a low intensity of interference signal and feeding the same back to the base station, or a method of increasing the CQI (Channel Quality Indicator) value for the region of a low intensity of interference signal and feeding the same back to the base station, may be applied to the present disclosure.

Figure 8:
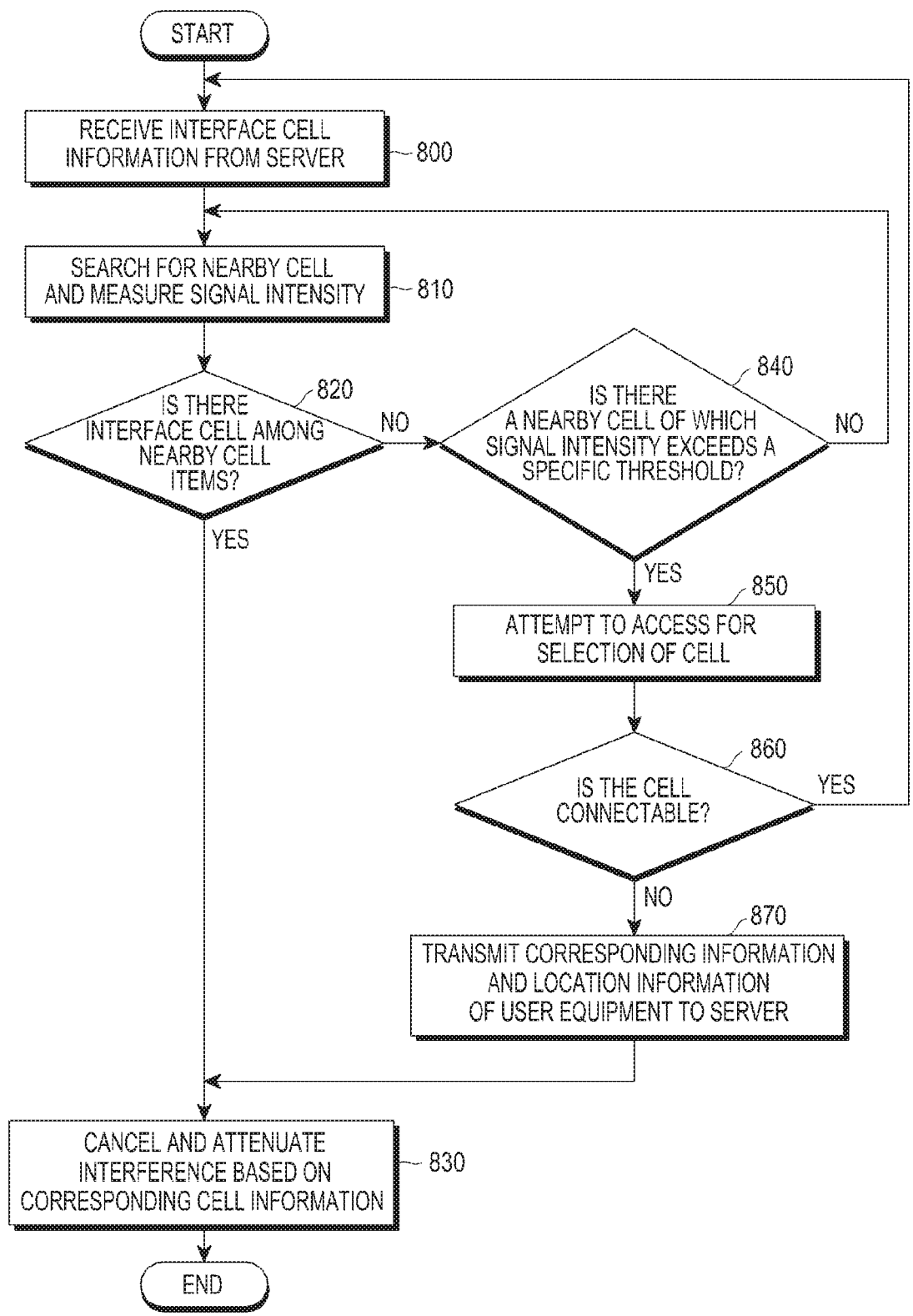
FIG. 8 is a flow chart of an operation of the user equipment, according to various embodiments of the present disclosure.

FIG. 8 is a flowchart of an operation of the user equipment, according to various embodiments of the present disclosure.

Referring to FIG. 8, the user equipment (e.g., the user equipment 700) receives the information on the interference cell from the server (e.g., the server 710) in step 800. In addition, the user equipment 700 may periodically search for the cell near the user equipment 700 and measure the signal intensity thereof in step 810. The user equipment 700 may determine whether or not, among the identification information on the nearby cells that are obtained through step 810, whether there is a nearby cell of which the identification information is the same as the identification information of the interference cell, which is obtained from the server through step 800. That is, the user equipment 700 may determine whether or not there is an interference cell near the user equipment in step 820. If there is an interference cell near the user equipment 700 (yes in step 820), the user equipment 700 may block the connection to the femto base station in the interference cell or may cancel/attenuate the interference due to the interference cell in step 830. The operation of cancelling/attenuating the interference due to the interference cell, may include a variety of operations, such as cancelling the inter symbol interference (ISI) according to the related art.

As a result of the determination in step 820, if there is no interference cell near the user equipment 700 (no in step 820), the user equipment 700 may identify whether or not there is a cell in which the signal intensity exceeds a predetermined threshold among the identification information of the detected nearby cells in step 840. In the case where there is no interference cell near the user equipment 700 (no in step 820), may include the case where the interference cell information is not contained in the shared database 712, or the case where there is no interference cell.

As a result of the determination in step 840, if there is a cell in which the signal intensity exceeds a predetermined threshold, the user equipment may attempt to access the cell for handover in step 850. After step 850, the user equipment 700 may identify whether or not the cell that the user equipment has attempted to access is a connectable cell in step 860, and if the cell is not a connectable cell, the user equipment 700 may recognize the corresponding cell as the interference cell and may send the corresponding cell information and the location information of the user equipment 700 to the CMS in step 870.

If there is no cell in which the signal intensity exceeds a predetermined threshold in step 840, the user equipment 700 may not determine the corresponding nearby cells to be available cells and may periodically perform the search for the nearby cells again. In addition, if the cell is identified to be a connectable cell in step 860 (yes in step 860), the user equipment 700 may determine the corresponding cell as the cell enabling the handover other than the interference cell in order to perform the handover process.

Figure 9:
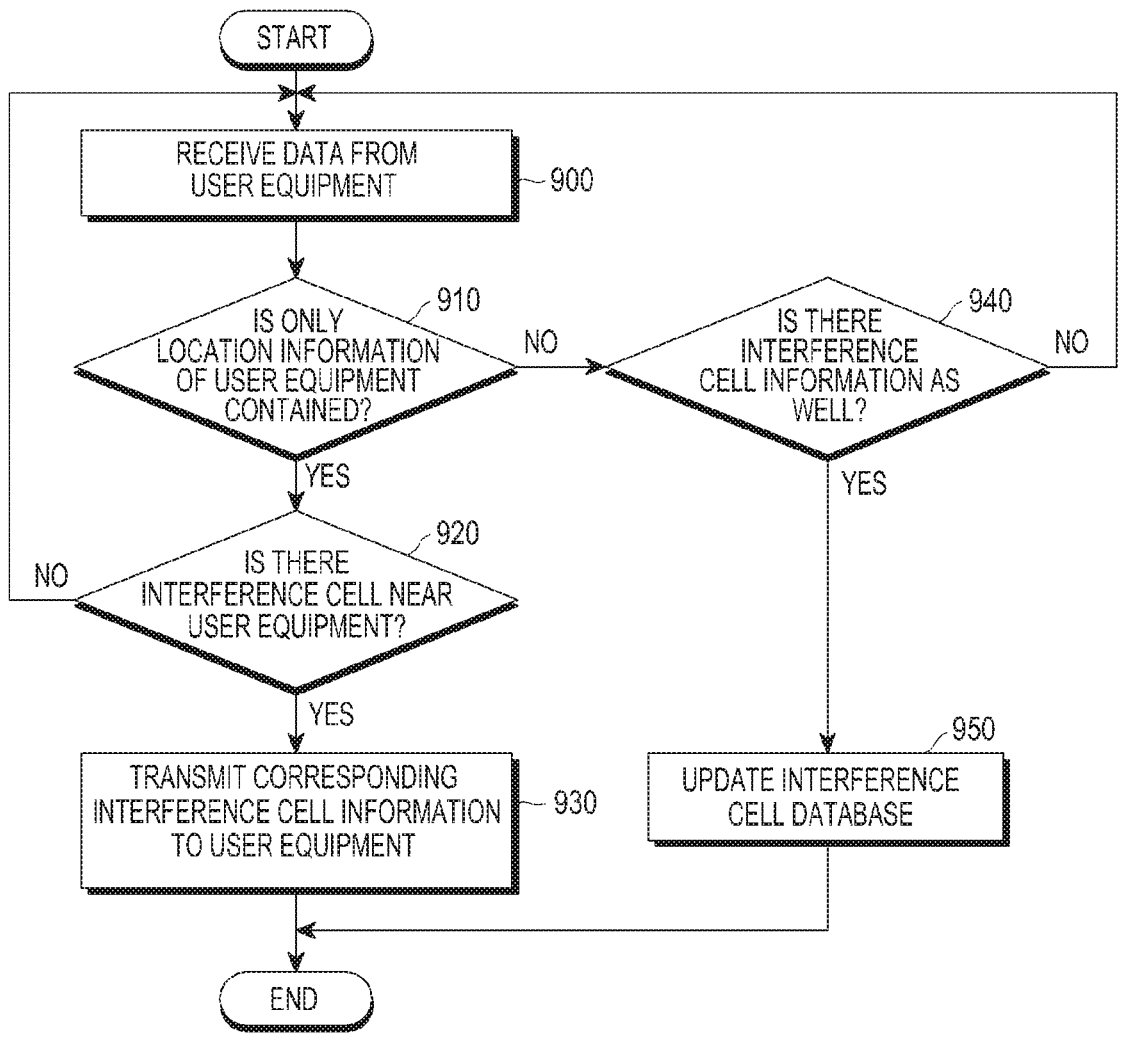
FIG. 9 is a flow chart of an operation of the server, according to various embodiments of the present disclosure.

FIG. 9 is a flowchart of an operation of the server, according to various embodiments of the present disclosure.

Referring to FIG. 9, the server (e.g., the server 710) receives data from the user equipment (e.g., the user equipment 700) in step 900, and determines whether or not only the location information of the user equipment is contained in the received data in step 910.

If only the location information of the user equipment is contained in the received data (yes in step 910), the server 710 determines whether or not there is an interference cell near the user equipment 700 based on the location information of the user equipment 700 with reference to the information that is stored in the shared database 712 of the server 710 in step 920. As a result of the determination in step 920, if there is an interference cell (yes in step 920), interference cell information may be transmitted to the user equipment 700 in step 930.

The server 710 may determine whether or not there is cell identification information (e.g., the interference cell identification information), as well as the location information of the user equipment, in the received data in step 940. As a result of the determination, if the location information of the user equipment and the cell identification information are contained in the received data, the server 710 updates the interference cell identification information stored in the shared database in step 950. If the interference cell identification information is not stored in the shared database 712, the server 710 may transmit a response stating that there is no interference cell to the user equipment 700, or may not transmit the response.

Figure 10:
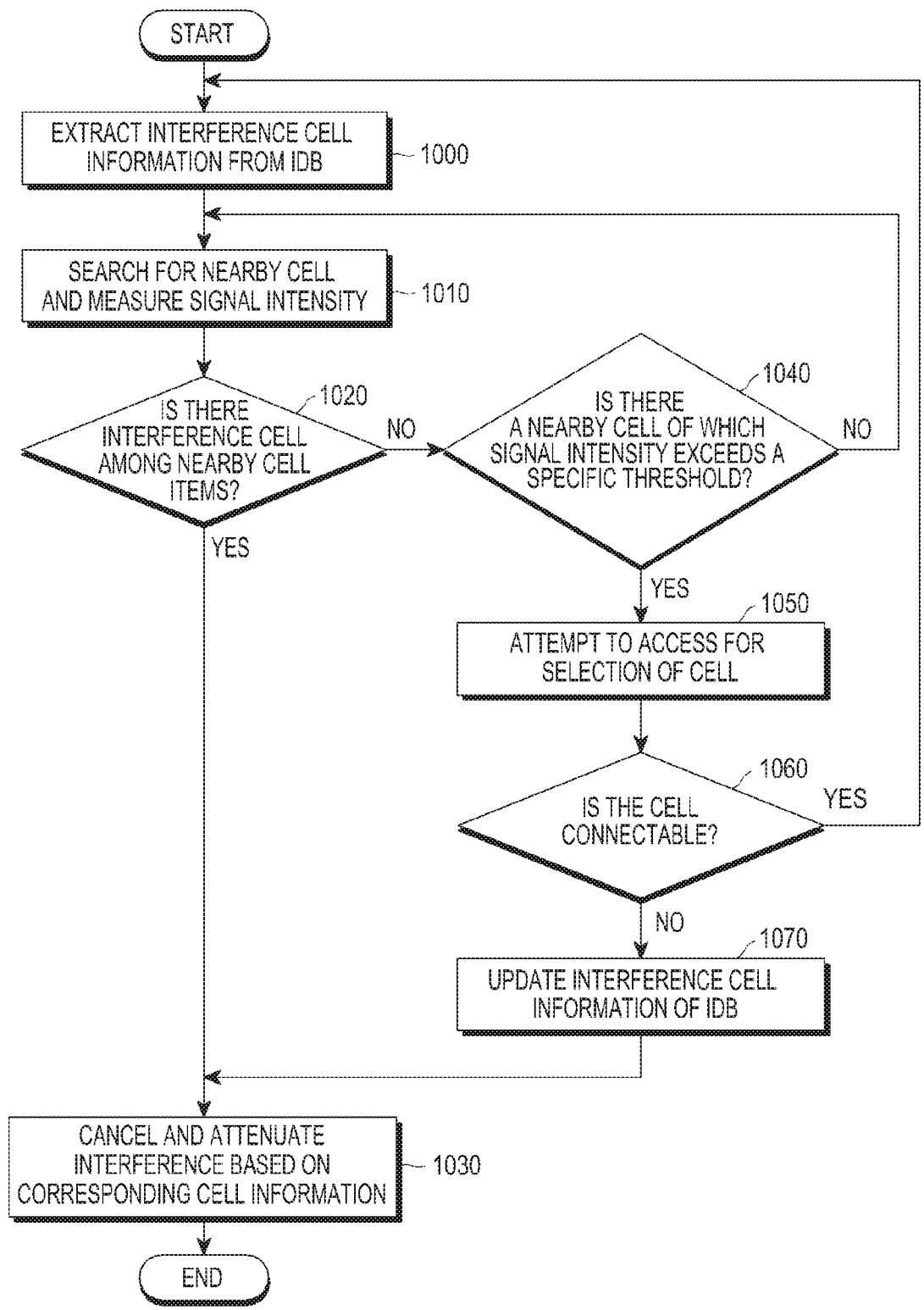
FIG. 10 is a flow chart of an operation of cancelling or attenuating the interference that occurs due to the interference cell based on cell identification information, according to various embodiments of the present disclosure.

FIG. 10 is a flowchart of an operation of cancelling or attenuating the interference that occurs due to the interference cell based on the cell identification information, according to various embodiments of the present disclosure.

Referring to FIG. 10, the operation of controlling the user equipment (e.g., the user equipment 700) includes an operation of extracting interference cell information from the IDB based on the current location information of the user equipment in step 1000. The operation of controlling the user equipment 700 includes an operation in which the user equipment 700 periodically searches for nearby cells and measures the signal intensity in step 1010. In the operation of controlling the user equipment 700, the user equipment 700 may identify whether or not, from among the nearby cell information, there is a nearby cell in which the identification information is the same as the interference cell identification information that is read from the IDB. That is, the user equipment 700 may determine whether or not there is an interference cell near the user equipment in step 1020. The operation of controlling the user equipment include an operation in which, if there is an interference cell near the user equipment (yes in step 1020), the user equipment 700 blocks access to the interference cell or cancels/attenuates the interference that occurs due to the interference in step 1030. Furthermore, the steps 840 to 870 described above in FIG. 8 may be equally applied to the steps 1040 to 1070 in FIG. 10.

The term "module" as used herein may refer to a unit including one of hardware, software, and firmware or a combination of two or more. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), a chipset, and a programmable-logic device for performing operations which are known or are to be developed.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more control modules (for example, the processor 202), the one or more control modules may execute a function corresponding to the command. The computer-readable storage medium may, for example, be the memory 203.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash storage module), and the like. In addition, the program instructions may include high level language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to describe technical details of the present disclosure and to help the understanding of the present disclosure, and do not limit the scope of the present disclosure.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A user equipment in a mobile communication system, the user equipment comprising:
   a transceiver configured to receive, from a server, information concerning predetermined interference regions and interference cells within the predetermined interference regions;
   a memory; and
   a processor that is electrically connected with the transceiver and the memory,
   wherein the processor is configured to:
      determine if the user equipment is located in a predetermined interference region based on the information concerning the predetermined interference regions and interference cells within the predetermined interference regions,
      if the user equipment is located in the predetermined interference region, determine whether there is an interference cell in the predetermined interference region, and
      if there is an interference cell, control to block an attempt to access the interference cell by the user equipment.

2. The user equipment of claim 1, wherein the predetermined interference region includes a predetermined range depending on a signal intensity of the interference cell or the coverage area of a macro base station that contains the interference cell.

3. The user equipment of claim 2, wherein the interference cell includes a femto-cell.

4. The user equipment of claim 1, wherein the processor is further configured to control to obtain cell identification information on one or more cells that are located in the predetermined interference region through the transceiver, and if there is cell identification information in the information concerning predetermined interference regions and interference cells within the predetermined interference regions that is the same as the cell identification information of the interference cell, determine that the interference cell exists.

5. The user equipment of claim 1, wherein the processor is further configured to, when an interference signal related to the interference cell is received by a communication module, control to cancel the interference signal.

6. The user equipment of claim 1, wherein the user equipment is an unlicensed user equipment with respect to a base station that supports the interference cell.

7. A control method of a user equipment in a mobile communication system, the method comprising:
   receiving, from a server, information concerning predetermined interference regions and interference cells within the predetermined interference regions;
   determining whether the user equipment is located in a predetermined interference region based on the information concerning predetermined interference regions and interference cells within the predetermined interference regions;
   if the user equipment is located in the predetermined interference region, determining whether there is an interference cell in the interference region; and
   if there is an interference cell, blocking an attempt to access the interference cell by the user equipment,
   wherein the information concerning predetermined interference regions and interference cells within the predetermined interference regions is downloaded from a server.

8. The method of claim 7, wherein the interference region includes a range that is predetermined according to a signal intensity of the interference cell or the coverage area of a macro base station that contains the interference cell.

9. The method of claim 8, wherein the interference cell includes a femto-cell.

10. The method of claim 7, further comprising:
    obtaining cell identification information on one or more cells that are located in the interference region; and
    if there is cell identification information in the information concerning predetermined interference regions and interference cells within the predetermined interference regions that is the same as the cell identification information of the interference cell among the obtained cell identification information, determining that the interference cell exists.

11. The method of claim 7, further comprising:
    when an interference signal related to the interference cell is received, cancelling the interference signal.

12. The method of claim 7, wherein the user equipment is an unlicensed user equipment with respect to a base station that supports the interference cell.

13. The method of claim 7, further comprising:
  detecting one or more cells that are located in the interference region.

14. A server in a mobile communication system, the server comprising:
  a transceiver configured to receive, from at least one user equipment, information concerning predetermined interference regions and interference cells within a predetermined interference regions:
  a shared database configured to store the information concerning predetermined interference regions and interference cells within a predetermined interference regions; and
  an information processor configured to control the transceiver to send to a user equipment located at a predetermined interference region among the predetermined interference regions, information related to location information and interference cell identification information of the predetermined interference region.

15. The server of claim 14, wherein the predetermined interference region includes a predetermined range depending on a signal intensity of the interference cell or the coverage area of a macro base station that contains the interference cell.

16. The server of claim 14, wherein the interference cell includes a femto-cell.

17. The server of claim 14, wherein the user equipment, when an interference signal related to the interference cell is received by a communication module, controls to cancel the interference signal.

18. The server of claim 14, wherein the user equipment is an unlicensed user equipment with respect to a base station that supports the interference cell.

* * * * *